US011122182B2

(12) United States Patent
Natori

(10) Patent No.: US 11,122,182 B2
(45) Date of Patent: Sep. 14, 2021

(54) INFORMATION PROCESSING APPARATUS, STORAGE MEDIUM, AND CONTROL METHOD WITH VOICE INSTRUCTION TO PEFORM PRINT SETTINGS OPERATION

(71) Applicant: CANON KABUSHIKI KAISHA, Tokyo (JP)

(72) Inventor: Takuya Natori, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/702,302

(22) Filed: Dec. 3, 2019

(65) Prior Publication Data

US 2020/0195810 A1 Jun. 18, 2020

(30) Foreign Application Priority Data

Dec. 13, 2018 (JP) .............................. JP2018-233250

(51) Int. Cl.
*G06F 3/12* (2006.01)
*H04N 1/00* (2006.01)

(52) U.S. Cl.
CPC ....... *H04N 1/00973* (2013.01); *G06F 3/1205* (2013.01); *G06F 3/1268* (2013.01); *G06F 3/1292* (2013.01); *H04N 1/00307* (2013.01); *G06F 3/1255* (2013.01)

(58) Field of Classification Search
None
See application file for complete search history.

(56) References Cited

U.S. PATENT DOCUMENTS

| 7,318,198 B2* | 1/2008 | Sakayori ................. G09B 21/00 704/E15.045 |
| 2006/0116884 A1* | 6/2006 | Itaki ........................ G10L 13/00 704/271 |
| 2008/0120562 A1* | 5/2008 | Honda .................... G09B 19/04 715/767 |
| 2009/0174896 A1* | 7/2009 | Nakamura ............. G06F 3/1207 358/1.15 |
| 2009/0310180 A1* | 12/2009 | Uchida ............... H04N 1/00514 358/1.15 |

(Continued)

FOREIGN PATENT DOCUMENTS

JP 2005-257973 A 9/2005

*Primary Examiner* — Haris Sabah
(74) *Attorney, Agent, or Firm* — Canon U.S.A., Inc. I.P. Division

(57) ABSTRACT

An information processing apparatus includes a first setting unit and a display control unit. The first setting unit sets a screen reader function to enabled or disabled based on a user instruction. The display control unit performs control to display, after an application installed in the information processing apparatus is started up, a screen regarding a specific function on a display unit where an operation for using the specific function of the application has been received. The display control unit performs control to display a first screen on the display unit as the screen regarding the specific function when the screen reader function is set to disabled, and displays, as the screen, a second screen having a display configuration different from the first screen and including predetermined information as information useful for a visually impaired person regarding the specific function when the screen reader function is set to enabled.

6 Claims, 10 Drawing Sheets

(56) References Cited

U.S. PATENT DOCUMENTS

| | | | | |
|---|---|---|---|---|
| 2014/0368878 A1* | 12/2014 | Asai | ................. | H04N 1/0044 |
| | | | | 358/1.15 |
| 2015/0138587 A1* | 5/2015 | Hiramatsu | ............ | G06F 3/1292 |
| | | | | 358/1.14 |
| 2018/0150271 A1* | 5/2018 | Yamaguchi | ........... | G06F 3/1229 |

* cited by examiner

INFORMATION PROCESSING APPARATUS, STORAGE MEDIUM, AND CONTROL METHOD WITH VOICE INSTRUCTION TO PEFORM PRINT SETTINGS OPERATION

BACKGROUND

Field

The present disclosure relates to an information processing apparatus, a storage medium, and a control method.

Description of the Related Art

In recent years, mobile terminal-type information processing apparatuses such as smart-phones providing a specific function (e.g., a print function) have been becoming common. Such a mobile terminal-type information processing apparatus having the print function searches for a print processing apparatus on a network via wireless communication, and determines a print processing apparatus to be used for printing. The information processing apparatus receives, from a user, a designation of a file to be printed from files stored in the mobile terminal. The files include a Joint Photographic Experts Group (JPEG) image file and a Portable Document Format (PDF) file. The information processing apparatus then generates print data to be used in the print processing, based on the file to be printed and print setting information specified by the user, and transmits the generated print data to the print processing apparatus that executes printing.

Further, iOS® and Android®, which are operating systems (OSs) installed in the mobile-type information processing apparatuses, are equipped with a screen reader function (e.g., a function of reading aloud a screen) designed for a visually impaired person, such as VoiceOver® screen reader built into an operating system and TalkBack® accessibility service to help blind and visually impaired users to interact with their mobile devices. The visually impaired person can use the screen reader function by enabling the screen reader function. The screen reader function is a function to output information regarding a screen and/or a user's selection state by voice to thus present such information to the user at a timing when the screen is switched or when an item on the screen is selected.

Japanese Patent Application Laid-Open No. 2005-257973 discusses a method to notify a visually impaired person, by voice, of information displayed on a liquid crystal display unit of a print processing apparatus.

For example, some of information processing apparatuses equipped with a print function have a function of displaying a print preview image indicating how data will be actually printed on a print medium, such as paper, on a display unit, when an instruction for the print processing is received. The print preview image may occupy most of the region on the display unit. At this time, if the screen reader function is enabled, it is possible to notify the user that the print preview image is present on the display as an explanation about the displayed print preview image. However, it is difficult to notify the user of detailed information about the print preview image. This means that useless information for the user (visually impaired person) occupies the most part on the display unit when the print preview image is displayed on the display unit. Accordingly, this decreases convenience of the information processing apparatus for the visually impaired user.

In this manner, the conventional technique involves an issue that the screen regarding the specific function may be less useful for the visually impaired user.

SUMMARY

According to an aspect of the present disclosure, an information processing apparatus includes a first setting unit configured to set a screen reader function to enabled or disabled based on an instruction from a user via an input unit, and a display control unit configured to perform control to display, after an application installed in the information processing apparatus is started up, a screen regarding a specific function on a display unit at least in a case where the specific function is a specific function of the application and an operation for using the specific function of the application has been received, wherein the display control unit performs control to display a first screen on the display unit as the screen regarding the specific function when the screen reader function is set to disabled by the first setting unit, and displays, on the display unit as the screen, a second screen having a display configuration different from the first screen and including predetermined information as information useful for a visually impaired person regarding the specific function when the screen reader function is set to enabled by the first setting unit.

Further features of the present disclosure will become apparent from the following description of exemplary embodiments with reference to the attached drawings.

DESCRIPTION OF THE EMBODIMENTS

Exemplary embodiments of the present disclosure will be described in detail with reference to the drawings below.

Figure 1:
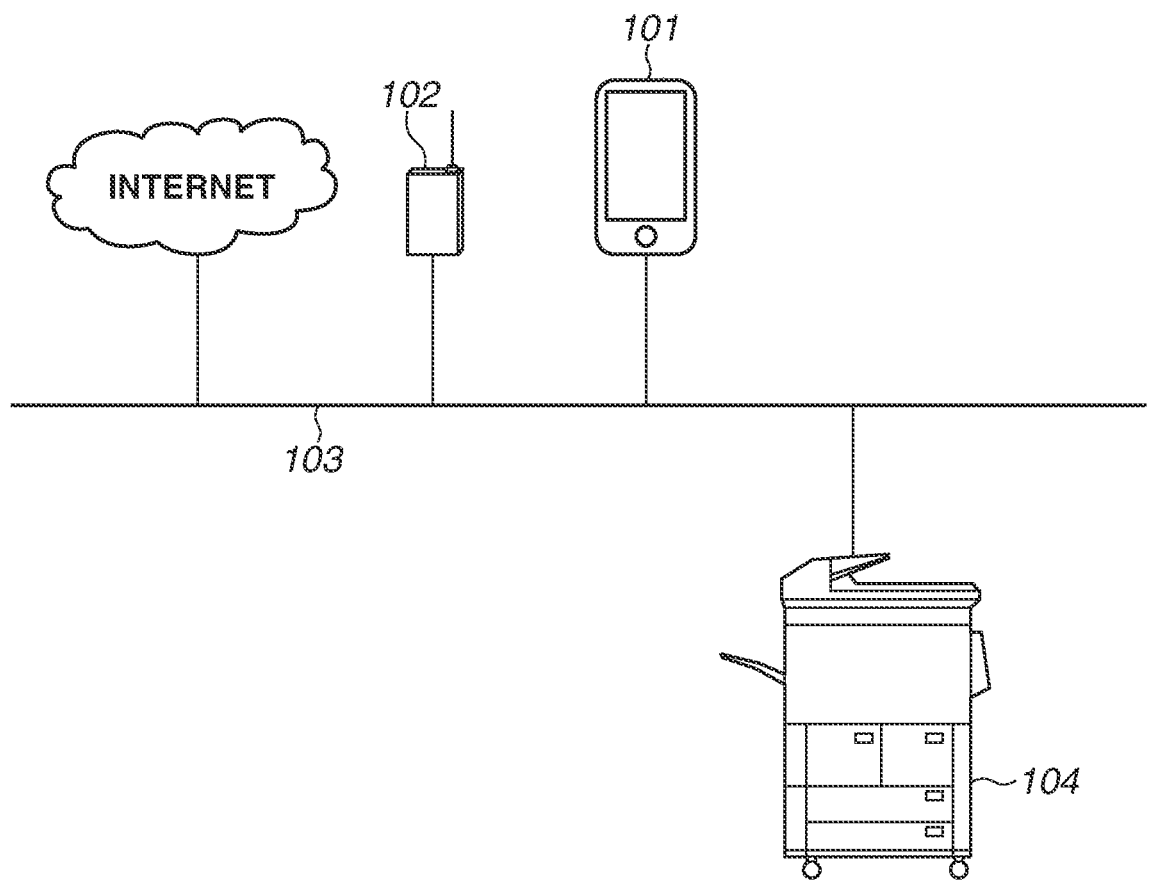
FIG. 1 illustrates one example of a system configuration of a data processing system.

FIG. 1 illustrates a system configuration of a data processing system according to a first exemplary embodiment. In the example illustrated in FIG. 1, the data processing system includes a data processing apparatus 101, a wireless local area network (LAN) terminal 102, and a print processing apparatus 104. The data processing apparatus 101, the wireless LAN terminal 102, and the print processing apparatus 104 are communicably connected with each other via a LAN 103.

The data processing apparatus 101 is an information processing apparatus that, for example, issues an instruction to transmit a print job to the print processing apparatus 104.

The data processing apparatus 101 is, for example, a smartphone, a tablet apparatus, a personal computer (PC), or a laptop PC. In the present exemplary embodiment, the data processing apparatus 101 is an information processing apparatus configured as a mobile apparatus. The data processing apparatus 101 may not be an information processing apparatus configured as a mobile apparatus.

The print processing apparatus 104 is a print processing apparatus, such as a printer and a multi-function peripheral, including a printer function, a copy function, a scanner function, and a facsimile transmission function.

The LAN 103 is a LAN to which each of the apparatuses in the data processing system is connected. The wireless LAN terminal 102 is a parent device of the wireless LAN having a network router function, and is used to realize a wireless LAN function via Wireless Fidelity (Wi-Fi®) in a location where the LAN 103 is laid.

Since the data processing apparatus 101 is a mobile terminal, the data processing apparatus 101 can participate in the LAN 103 via the wireless LAN terminal 102 by enabling the Wi-Fi® function. Once entering a wireless LAN area provided by the wireless LAN terminal 102, the data processing apparatus 101 can participate in the network of the LAN 103 using preset authentication information.

Figure 2:
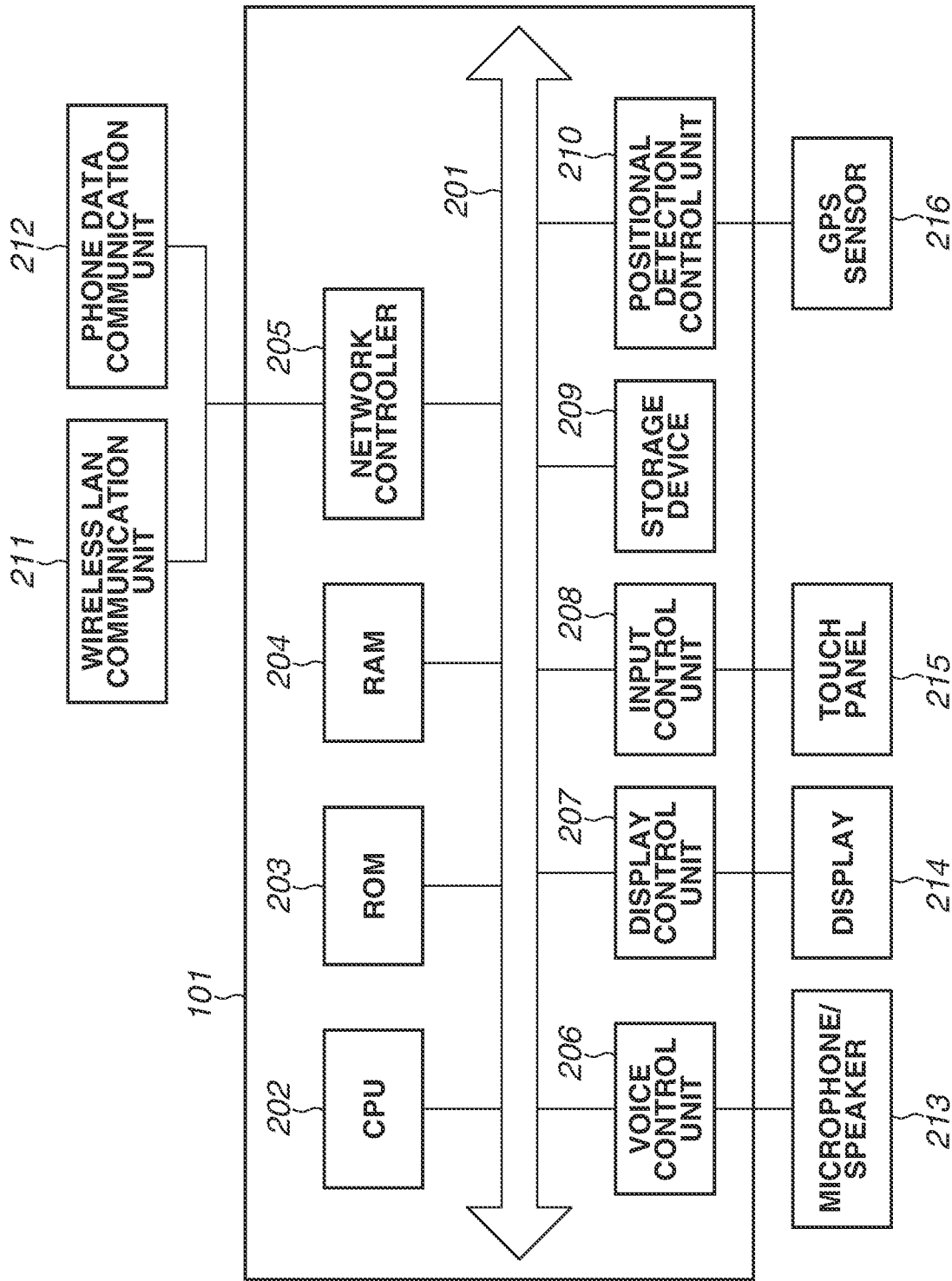
FIG. 2 is a block diagram illustrating one example of a hardware configuration of a data processing apparatus.

FIG. 2 illustrates one example of a hardware configuration of the data processing apparatus 101. In the present exemplary embodiment, the data processing apparatus 101 executes an operating system designed for a small-sized terminal, and programs for controlling a phone call and data communication.

The data processing apparatus 101 includes a central processing unit (CPU) 202, a read only memory (ROM) 203, a random access memory (RAM) 204, a network controller 205, a voice control unit 206, a display control unit 207, an input control unit 208, a storage device 209, and a positional detection control unit 210. Each of the components is communicably connected each other via a system bus 201.

The CPU 202 is a central arithmetic device that controls the data processing apparatus 101. The ROM 203 is a storage device that stores therein, for example, the operating system of the data processing apparatus 101, and the programs of the applications that control, for example, the phone call, and the data communication. Examples of the application that controls the data communication include a print application, electronic mail software, and a web browser. The RAM 204 is a storage device that functions as a work memory of the CPU 202 and a temporary storage area for data. When executing an execution target program, the CPU 202 load the program and write the program in the RAM 204.

The network controller 205 is a controller used in the data communication between the data processing apparatus 101 and an external apparatus. The network controller 205 is connected to a wireless LAN communication unit 211 and a phone data communication unit 212.

The wireless LAN communication unit 211 is used to participate in the network of the LAN 103 via the wireless LAN terminal 102. The phone data communication unit 212 is used to participate in a network provided by a mobile phone carrier.

For example, the network controller 205 prioritizes a connection to a wireless LAN network, when the data processing apparatus 101 can participate in the wireless LAN network. When the data processing apparatus 101 moves out of the network area covered by the wireless LAN, the network controller 205 performs exclusive control so as to cause the data processing apparatus 101 to participate in the wireless communication network provided by the mobile phone carrier.

The voice control unit 206 is used to input and output voice data via a microphone/speaker 213. The voice control unit 206 is used, for example, when the phone call application starts up and a user is talking on the phone. The voice control unit 206 outputs voice data output by a screen reader function (described below) via a speaker of the microphone/speaker 213. The screen reader function refers to a function of assisting a user's operation by outputting information by voice.

The display control unit 207 is a control unit that controls information to be output onto a display 214. The display 214 is one example of a display unit. The input control unit 208 is a control unit that receives information input by the user via an input unit, such as a button, and a touch panel 215, on the data processing apparatus 101. In the present exemplary embodiment, the touch panel 215 is overlaid on the display 214. The CPU 202 detects an operation, such as a tap onto a screen displayed on the display 214, via the touch panel 215.

An application realized on the data processing apparatus 101 provides network communication information and various kinds of information about the data processing apparatus 101 to the user using the voice control unit 206, the display control unit 207, and the input control unit 208.

The storage device 209 is a nonvolatile storage device, and stores therein, for example, various kinds of operation mode settings to be held even after the data processing apparatus 101 is restarted up, an operation log, various kinds of programs, and various kinds of setting information. The storage device 209 is, for example, a hard disk drive (HDD), a solid state drive (SSD), and/or a flash memory.

The positional detection control unit 210 is a control unit that acquires positional information of the data processing apparatus 101 via a Global Positioning System (GPS) sensor 216, and provides the positional information to the operating system.

In the data processing apparatus 101 including these components, the CPU 202 performs processing based on the program stored in, for example, the ROM 203, and the storage device 209, thereby realizing, for example, functions that will be described below with reference to FIG. 4, and processing procedures according to flowcharts that will be described below with reference to FIGS. 5 and 8. In other words, the CPU 202, the ROM 203, and the storage device 209 function as a so-called computer. A plurality of processors, memories, and storages can be used to cooperate with each other to perform each of the processing procedures. A part of the processing procedures can also be performed using a hardware circuit, such as an application specific integrated circuit (ASIC).

Figure 3:
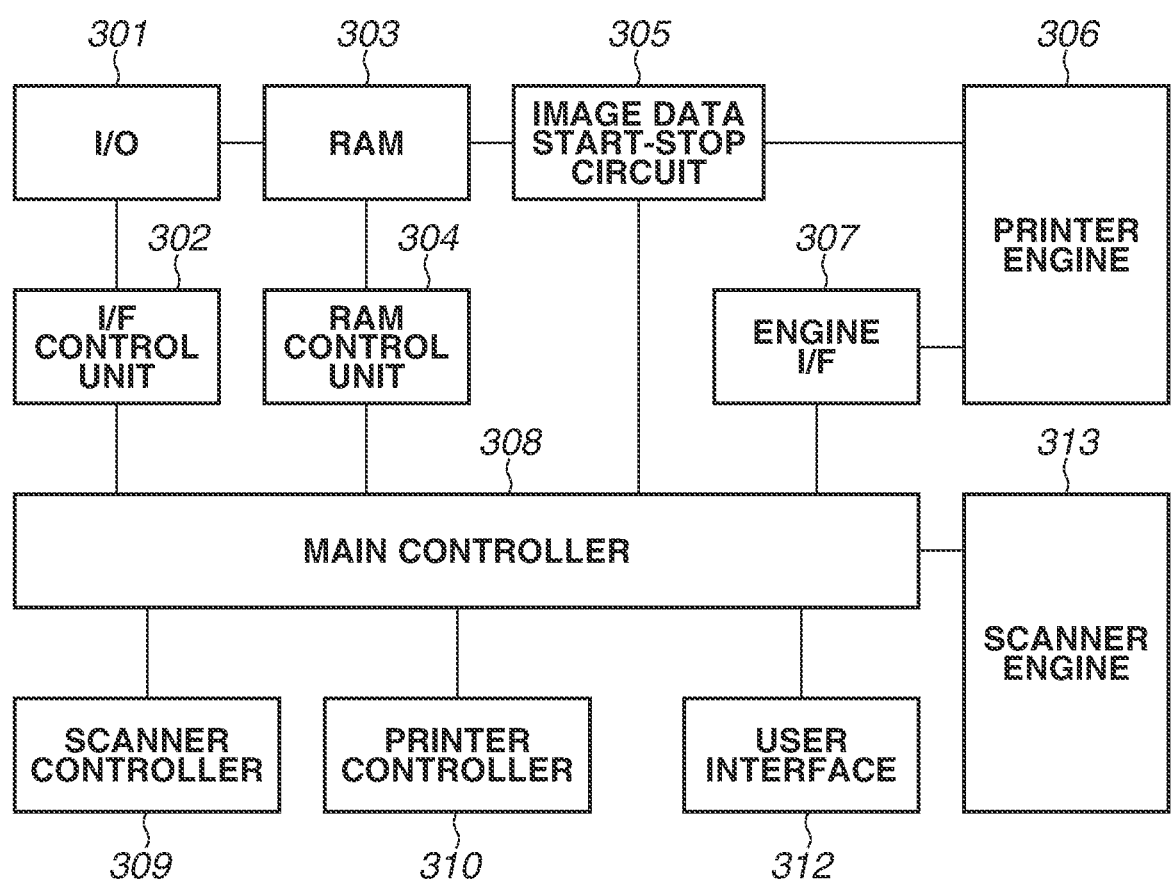
FIG. 3 is a block diagram illustrating one example of a hardware configuration of a print processing apparatus.

FIG. 3 illustrates one example of a hardware configuration of the print processing apparatus 104. The print processing apparatus 104 is assumed to be a multi function peripheral (MFP) having the scanner function and the printer function applied in the present exemplary embodiment, but is not limited to this MFP. As another example, the print processing apparatus 104 may be a print processing apparatus, such as a printer not having a reading function. In the present exemplary embodiment, the print processing apparatus 104 is assumed to include various kinds of components that will be described below, as one example thereof.

The print processing apparatus 104 includes an input/output (I/O) 301, an interface (I/F) control unit 302, a RAM 303, a RAM control unit 304, an image data start-stop circuit 305, a printer engine 306, an engine I/F 307, and a main controller 308. The print processing apparatus 104 includes a scanner controller 309, a printer controller 310, a user interface 312, and a scanner engine 313.

The I/O 301 is an interface used for a connection between the print processing apparatus 104 and an external apparatus. The print processing apparatus 104 transmits a device identification (ID) and a scanned image to the data processing apparatus 101 via the I/O 301. The print processing apparatus 104 receives various kinds of control commands from the data processing apparatus 101 via the I/O 301, and performs processing based on the received control commands.

The I/F control unit 302 is a control unit that performs control of issuing the device ID to a device, such as a scanner, a printer, and a facsimile machine, mounted on the print processing apparatus 104. The RAM 303 is a storage device that functions as a temporary storage area to store therein, for example, external data including the control command acquired via the I/O 301, and data of an image read by the scanner engine 313. The RAM 303 is used, for example, to store an image to be transferred to the printer engine 306 loaded by the printer controller 310. The RAM control unit 304 is a control unit that manages allocation of a storage area in the RAM 303.

The image data start-stop circuit 305 is a device that outputs the image in the RAM 303 loaded by the RAM control unit 304 in synchronization with a rotation of the printer engine 306. The printer engine 306 is a device that develops the image onto an output medium such as paper (e.g., a print medium). The main controller 308 is a controller in charge of various kinds of control of the printer engine 306 via the engine I/F 307. The main controller 308 performs processing for appropriately distributing a control language received from the data processing apparatus 101 via the I/O 301 to the scanner controller 309 or to the printer controller 310. The main controller 308 controls the printer engine 306 and the scanner engine 313 based on an instruction from the respective controllers thereof or the user interface 312.

The scanner controller 309 separates a scan control command transmitted from the data processing apparatus 101 into an internal execution command interpretable by the main controller 308. The scanner controller 309 converts the image read by the scanner engine 313 into a scan control command. The printer controller 310 separates Page Description Language (PDL) data received as the print job transmitted from the data processing apparatus 101 into an internal execution command including the loaded image and the like that is interpretable by the main controller 308. The loaded image is transmitted to the printer engine 306 and is printed onto the output medium such as paper.

Figure 4:
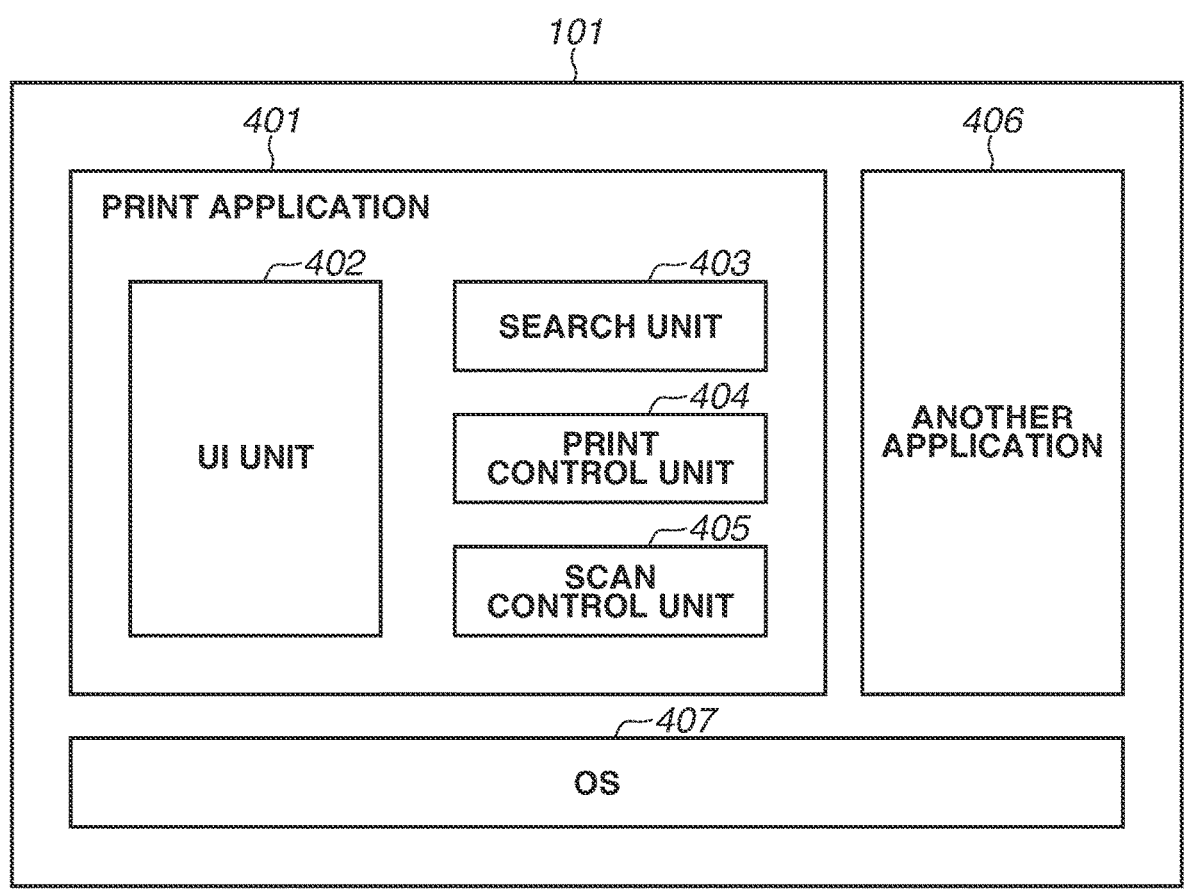
FIG. 4 is a block diagram illustrating one example of a functional configuration of the data processing apparatus.

FIG. 4 illustrates one example of a functional configuration of the data processing apparatus 101. The data processing apparatus 101 includes a print application 401, another application 406, and an operating system (OS) 407.

The print application 401 is an application that controls the print processing. The print application 401 includes a user interface (UI) unit 402, a search unit 403, a print control unit 404, and a scan control unit 405. The print application 401 is downloaded from, for example, an application store, and an external storage device, through a user's operation. The downloaded print application 401 is installed into the data processing apparatus 101 as an application that runs on the OS 407. Alternatively, as another example, the print application 401 may be installed in advance when the data processing apparatus 101 is newly shipped. The UI unit 402 is configured to control an input/output of information to/from the print application 401, and provides a user interface to change a setting in the print application 401. The search unit 403 searches for a network apparatus by which the data processing apparatus 101 can be managed based on Simple Network Management Protocol (SNMP) in the LAN 103 to which the data processing apparatus 101 is connected. The search unit 403 then searches for a print processing apparatus capable of carrying out the printing among discovered network apparatuses.

The print control unit 404 generates the print job to be transmitted to the print processing apparatus, and transmits the generated print job to the print processing apparatus corresponding thereto. The scan control unit 405 carries out communication between the data processing apparatus 101 and the print processing apparatus 104 equipped with the scan function, and provides a function of controlling execution of a scan job. The other application 406 is an application installed in the data processing apparatus 101 and is unrelated to the processing of the print application 401. The other application 406 does not affect the processing of the print application 401.

The OS 407 is an OS for controlling the entire data processing apparatus 101. The OS 407 according to the present exemplary embodiment has a screen reader function of assisting an operation by reading aloud information such as a character string and the like displayed on the operation screen by voice. In a case where iOS is employed as the OS, the screen reader function is provided by the VoiceOver function pre-installed to improve the accessibility. Alternatively, in a case where Android is employed as the OS, the screen reader function is provided by the TalkBack function pre-installed to improve the accessibility. These screen reader functions can be each switched between "enabled" (ON) and "disabled" (OFF) from a setting screen provided by the OS 407. Setting information regarding these screen readers is stored in the storage device 209. When the screen reader function is set to ON, the data processing apparatus 101 reads aloud the operation screen. The data processing apparatus 101 reads aloud the operation screen according to, for example, the user's tapping a displayed object or a displayed character string. The data processing apparatus 101 reads aloud the operation screen according to a transition of the operation screen.

When the print application 401 requests a setting state (enabled or disabled) of the screen reader function to the OS 407, the OS 407 reads out the setting information of the screen reader function from the storage device 209, and identifies the setting state of the screen reader function. The OS 407 then notifies the print application 401, which is the request source, of the setting state of the screen reader function. Accordingly, the print application 401 can acquire the setting state of the screen reader function from the OS 407.

Figure 5:
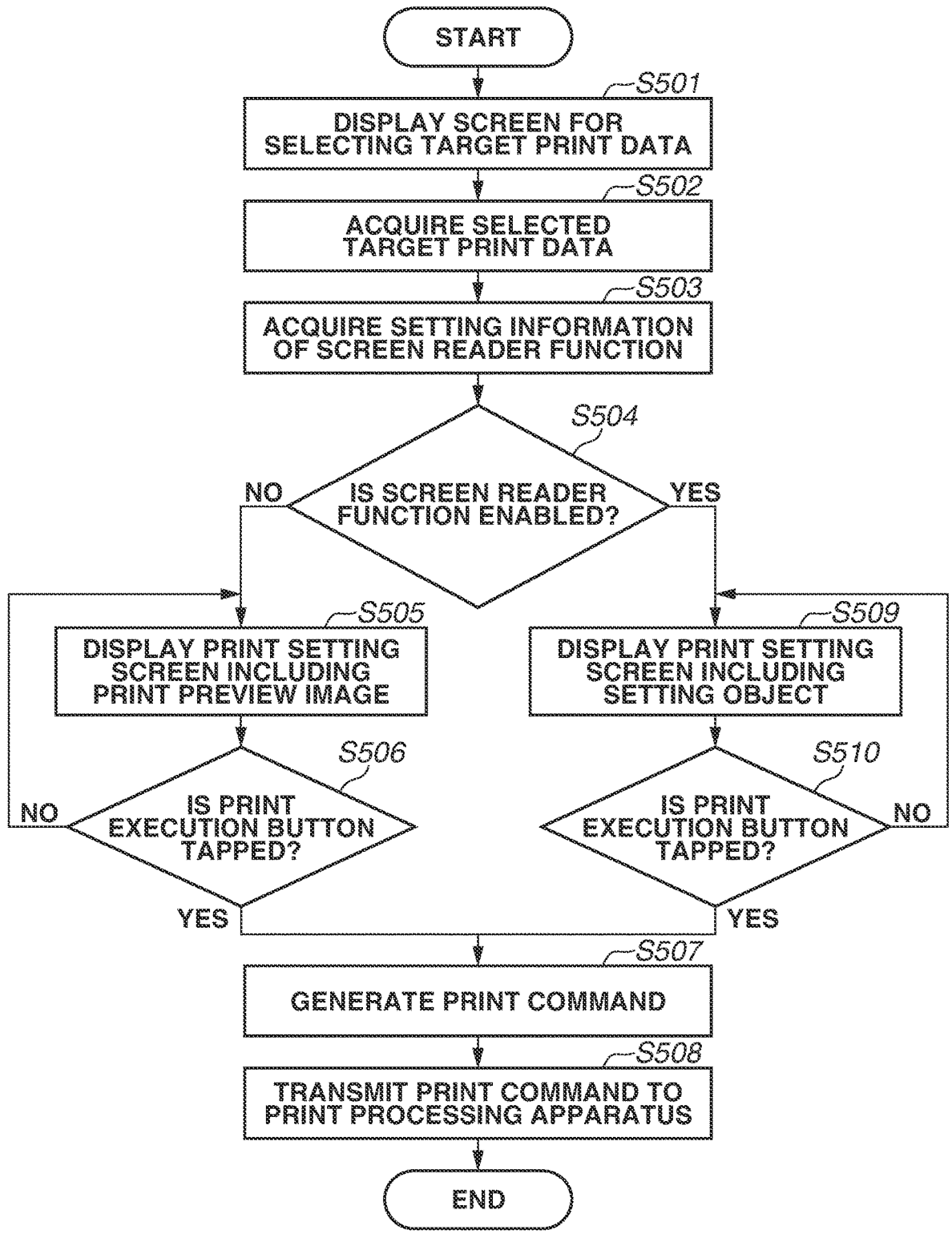
FIG. 5 is a flowchart illustrating one example of processing performed by a print application.

FIG. 5 is a flowchart illustrating one example of processing until the print application 401 performs the printing. A part of the processing illustrated in FIG. 5 is realized by cooperation of the print application 401 with the OS 407 and another control unit.

In step S501, the print application 401 displays a screen, on the display 214, used for selecting data targeted for the printing. In the present exemplary embodiment, the print application 401 displays, on the display 214, printable data among data pieces stored in the storage device 209 of the data processing apparatus 101 as a list. This printable data is data such as a Joint Photographic Experts Group (JPEG) image file, a Portable Document Format (PDF) file, a text file, and a table data file. The print application 401 displays a list in which filenames are listed as printable data. However, as another example, the print application 401 may display a list in which icons or thumbnails corresponding to individual data pieces are listed as printable data.

The user checks the data list displayed on the display 214 and determines data the user wants to print. The user then taps the data in the list that the user wants to print via the touch panel 215. Upon detecting the user's tap via the touch panel 215, the print application 401 selects the data corresponding to the detected tapped position as the data to be printed. Hereinafter, the selected data to be printed will be referred to as a target print data.

In step S502, the print application 401 acquires the selected target print data from the storage device 209.

In step S503, the print application 401 requests the setting information indicating whether the screen reader function is enabled or disabled to the OS 407. The OS 407 acquires the setting information indicating whether the screen reader function is enabled or disabled that is stored in the storage device 209, and notifies the print application 401 of the acquired setting information. Thus, the print application 401 acquires the setting information indicating whether the screen reader function is enabled or disabled.

In step S504, the print application 401 determines whether the screen reader function is enabled or disabled based on the setting information acquired in step S503. If the print application 401 determines that the screen reader function is enabled (YES in step S504), the processing proceeds to step S509. If the print application 401 determines that the screen reader function is disabled (NO in step S504), the processing proceeds to step S505.

In step S505, the print application 401 displays a print setting screen on the display 214. The print setting screen is a screen regarding the print function, and is a screen displayed when the target print data is selected. The print setting screen is used to set and to confirm print setting items regarding the print processing on the target print data. The print setting items include a size of a print sheet, a color mode indicating whether color printing or monochrome printing, the number of copies, a sheet feeding tray to use, and a print density. The print setting screen displayed in step S505 includes a print preview image. The print preview image is an image indicating how the target print data will be actually printed on the print medium such as paper.

The print setting screen displayed by the print application 401 in step S505 will be described with reference to FIGS. 6A to 6C.

Figure 6A:
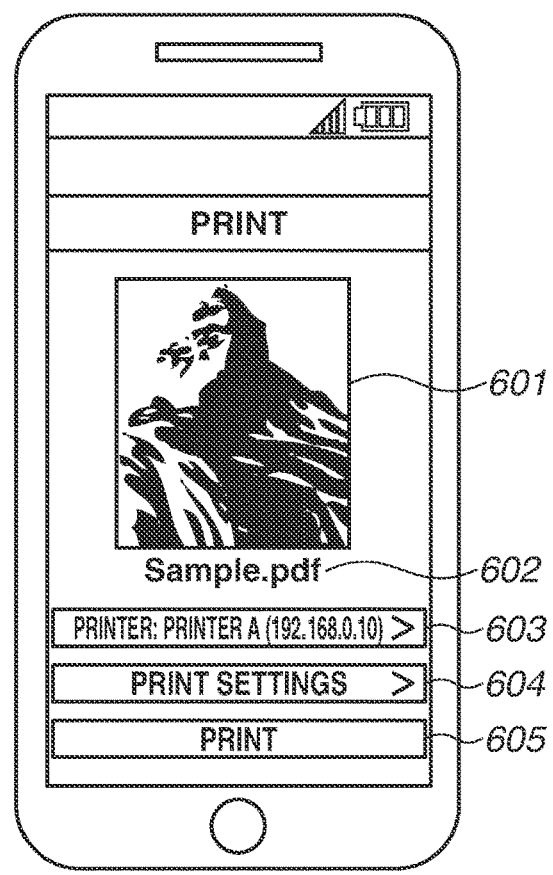
FIGS. 6A to 6C each illustrate one example of a print setting screen.

Upon starting the processing in step S505, the print application 401 displays, on the display 214, a print setting screen illustrated in FIG. 6A. The print setting screen illustrated in FIG. 6A includes a print preview image 601, a display region 602, and buttons 603 to 605. The print preview image 601 is an image indicating how the target print data will be actually printed. A user, who is a sighted person, can easily understand a print result by visually confirming the print preview image 601. The print setting screen illustrated in FIG. 6A is one example of a first screen. The display region 602 is a region in which a name of the target print data is displayed. The button 603 is used to instruct the data processing apparatus 101 to transition to a printer selection screen used to select the print processing apparatus that will print the target print data. The button 604 is used to transition to an item setting screen used to set various kinds of print setting items. A button 605 is used to instruct the data processing apparatus 101 to perform the print processing on the target print data.

Processing performed by the print application 401 when the button 603 is tapped on the print setting screen illustrated in FIG. 6A will be described.

Figure 6B:
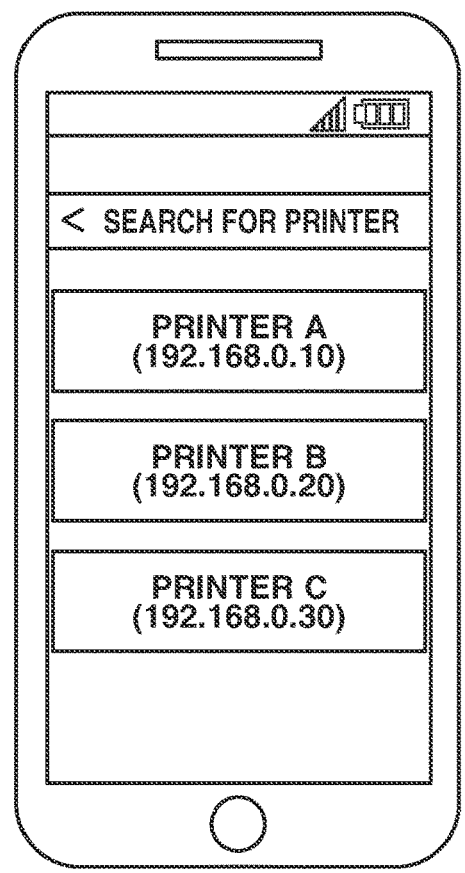

The print application 401 displays a printer selection screen illustrated in FIG. 6B on the display 214, when the tap onto the button 603 via the touch panel 215 is detected. The print application 401 searches for a network apparatus managed based on SNMP that exists in the same sub-network as the LAN 103, to which the data processing apparatus 101 belongs. The print application 401 searches for a print processing apparatus capable of performing the print processing from discovered network apparatuses. The print application 401 then displays a result of this search as a list within the printer selection screen.

The user taps, via the touch panel 215, the print processing apparatus the user wants to use from the print processing apparatuses displayed in the list. The print application 401 detects the tap and determines that the print processing apparatus corresponding to the detected tapped position is the apparatus to perform the print processing on the target print data. The print application 401 causes the screen on the display 214 to transition to the print setting screen illustrated in FIG. 6A. The print application 401 displays information about the determined print processing apparatus within the area of button 603. Accordingly, the user can confirm which print processing apparatus will perform the print processing by visually checking the button 603.

The present exemplary embodiment will be described, assuming that the print processing apparatus 104 is selected as the print processing apparatus that will perform the print processing.

Processing performed by the print application 401 when the button 604 is tapped on the print setting screen illustrated in FIG. 6A will be described.

Figure 6C:
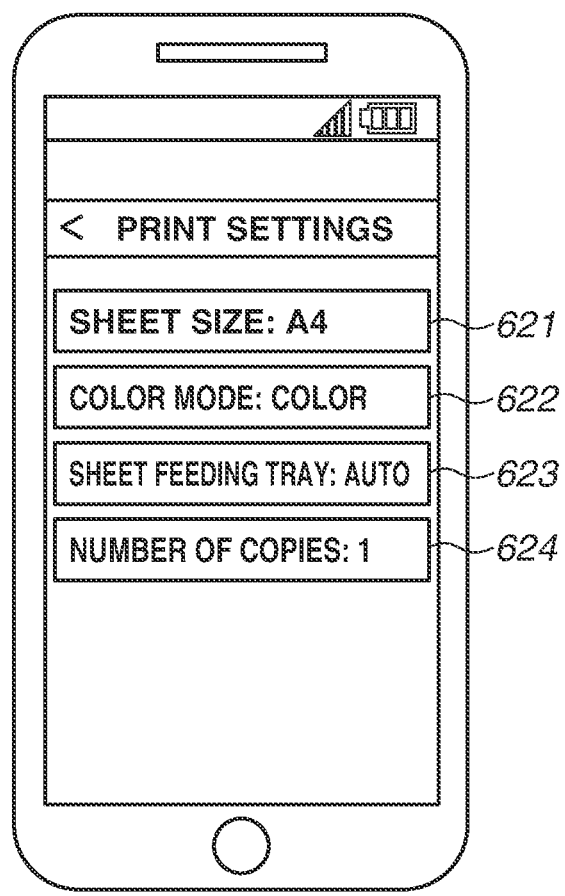

When detecting the tap onto the button 604 via the touch panel 215, the print application 401 displays an item setting screen illustrated in FIG. 6C on the display 214. The print application 401 acquires information about settable print setting items from the print processing apparatus 104, which has been selected via the printer selection screen. The print application 401 then displays, on the display 214, the item setting screen, which includes buttons respectively used to set various kinds of print setting items indicated by the acquired information.

In the present exemplary embodiment, the print application 401 acquires the information about the items, as the information about the settable print setting items, including the sheet size, the color mode, the sheet feeding tray, and the number of copies from the print processing apparatus 104 which has been selected via the printer selection screen. In response to the acquirement, buttons 621 to 624 used to set the items indicating the sheet size, the color mode, the sheet feeding tray, and the number of copies, respectively, are displayed on the item setting screen. The button 621 is used to set the sheet size. The button 622 is used to set the color mode. The button 623 is used to set the sheet feeding tray. The button 624 is used to set the number of copies. The user can set the respective print setting items including the sheet size, the color mode, the sheet feeding tray, and the number of copies using the buttons 621 to 624, respectively.

When detecting a tap onto any of the buttons 621 to 624, the print application 401 displays, on the display 214, a list of candidates for the setting value of the print setting item corresponding to the tapped button. The print application 401 then acquires a setting value tapped by the user from the displayed list, and sets the acquired setting value as the value of this print setting item.

The print application 401 updates the displayed content of the print preview image 601 on the print setting screen illustrated in FIG. 6A, based on the setting value of the print setting item set using any of the buttons 621 to 624. For example, if the print setting item indicating the color mode is changed from the color printing to the monochrome printing using the button 622, the print application 401 updates the print preview image 601 as a monochrome image.

The description will continue, referring back to FIG. 5. In step S506, the print application 401 determines whether a tap onto the button 605 is detected on the print setting confirmation screen displayed in step S505. If the print application 401 determines that a tap onto the button 605 is detected (YES in step S506), the processing proceeds to step S507. If the print application 401 determines that no tap onto the button 605 is detected (NO in step S506), the processing proceeds to step S505.

In step S507, the print application 401 generates a print command interpretable by the print processing apparatus 104, which performs the print processing on the target print data, based on the target print data and the setting values of the print setting items.

In step S508, the print application 401 transmits the print command generated in step S507 to the print processing apparatus 104, and instructs the print processing apparatus 104 to print the target print data.

In step S509, the print application 401 displays, on the display 214, a print setting screen including a setting object, which is an object used to set the print setting item, instead of the print preview image.

The print setting screen displayed in step S509 by the print application 401 will be described with reference to FIGS. 7A and 7B.

Figure 7A:
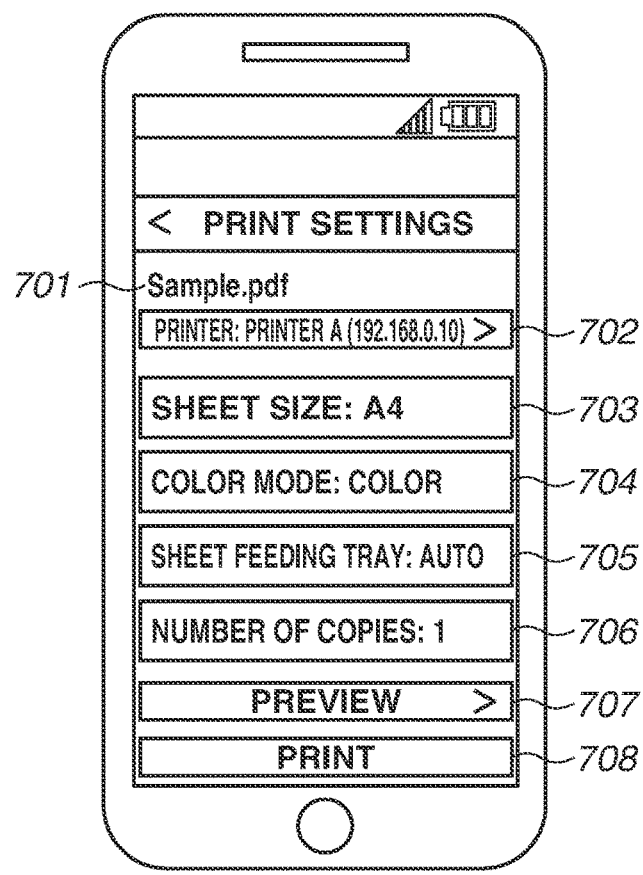
FIGS. 7A and 7B each illustrate one example of a print setting screen.

Upon starting the processing in step S509, the print application 401 displays a print setting screen illustrated in FIG. 7A on the display 214. The print setting screen illustrated in FIG. 7A includes a display region 701 and buttons 702 to 708. The display region 701 is a region in which the name of the target print data is displayed. The button 702 is a button that is used to instruct the data processing apparatus 101 to transition to the printer selection screen, which is used to select the print processing apparatus that prints the target print data.

The button 703 is a button used to set the sheet size, which is one of the print setting items. The button 704 is a button used to set the color mode, which is one of the print setting items. The button 705 is a button used to set the sheet feeding tray, which is one of the print setting items. The button 706 is a button used to set the number of copies, which is one of the print setting items. The user can set the respective print setting items indicating the sheet size, the color mode, the sheet feeding tray, and the number of copies using the buttons 703 to 706, respectively. The buttons 703 to 706 are each one example of the setting object.

When detecting a tap onto any of the buttons 703 to 706, the print application 401 displays, on the display 214, the list of candidates for the setting value of the print setting item corresponding to the tapped button. The print application 401 then acquires the setting value tapped by the user from the displayed list, and sets the acquired setting value as the value of this print setting item.

The print setting screen illustrated in FIG. 7A includes the buttons 703 to 706 used to set the print setting items. The print setting screen does not include the print preview image as compared with the print setting screen illustrated in FIG. 6A. The print preview image contains a lot of useful information for a sighted person capable of visually confirming the print preview image. However, the print preview image contains little useful information for a visually impaired person incapable of visually confirming the print preview image. The print setting screen illustrated in FIG. 7A contains, instead of the print preview image, useful information for the visually impaired person that is not contained in the print setting screen illustrated in FIG. 6A. Therefore, the print application 401 can improve usability for the visually impaired person by displaying the print setting screen illustrated in FIG. 7A on the display 214. The print setting screen illustrated in FIG. 7A is one example of a second screen.

The button 707 is used to instruct the data processing apparatus 101 to transition to a screen on which the print preview image of the target print data is displayed. The button 707 is one example of a transition object. The button 708 is used to instruct the data processing apparatus 101 to perform the print processing on the target print data.

Processing performed by the print application 401 when the button 702 is tapped on the print setting screen illustrated in FIG. 7A is similar to the processing performed by the print application 401 when the button 603 described with reference to FIG. 6 is tapped.

Processing performed by the print application 401 when the button 707 is tapped on the print setting screen illustrated in FIG. 7A will be described.

Figure 7B:

When detecting the tap onto the button 707, the print application 401 displays, on the display 214, the screen indicating the print preview image of the target print data as illustrated in FIG. 7B. In this manner, the print application 401 can also present the print preview image to the user even when the print setting screen illustrated in FIG. 7A is displayed. Therefore, the print application 401 can deal with a case even when the screen reader function is enabled and the user is a sighted person and requires to visually confirm the print preview image.

In step S510, the print application 401 determines whether a tap onto the button 708 is detected on the print setting confirmation screen displayed in step S509. If the print application 401 determines that a tap onto the button 708 is detected (YES in step S510), the processing proceeds to step S507. If the print application 401 determines that no tap onto the button 708 is detected (NO in step S510), the processing proceeds to step S509.

In this manner, in the present exemplary embodiment, the data processing apparatus 101 displays the print setting screen, on the display 214, including the buttons 703 to 706, which is the useful information for the visually impaired person, when the screen reader function is set to enabled. Accordingly, the data processing apparatus 101 can improve the usability for a visually impaired user.

A data processing apparatus 101 according to a second exemplary embodiment selects whether to change the display of the print setting screen when the screen reader function is enabled.

Figure 8:
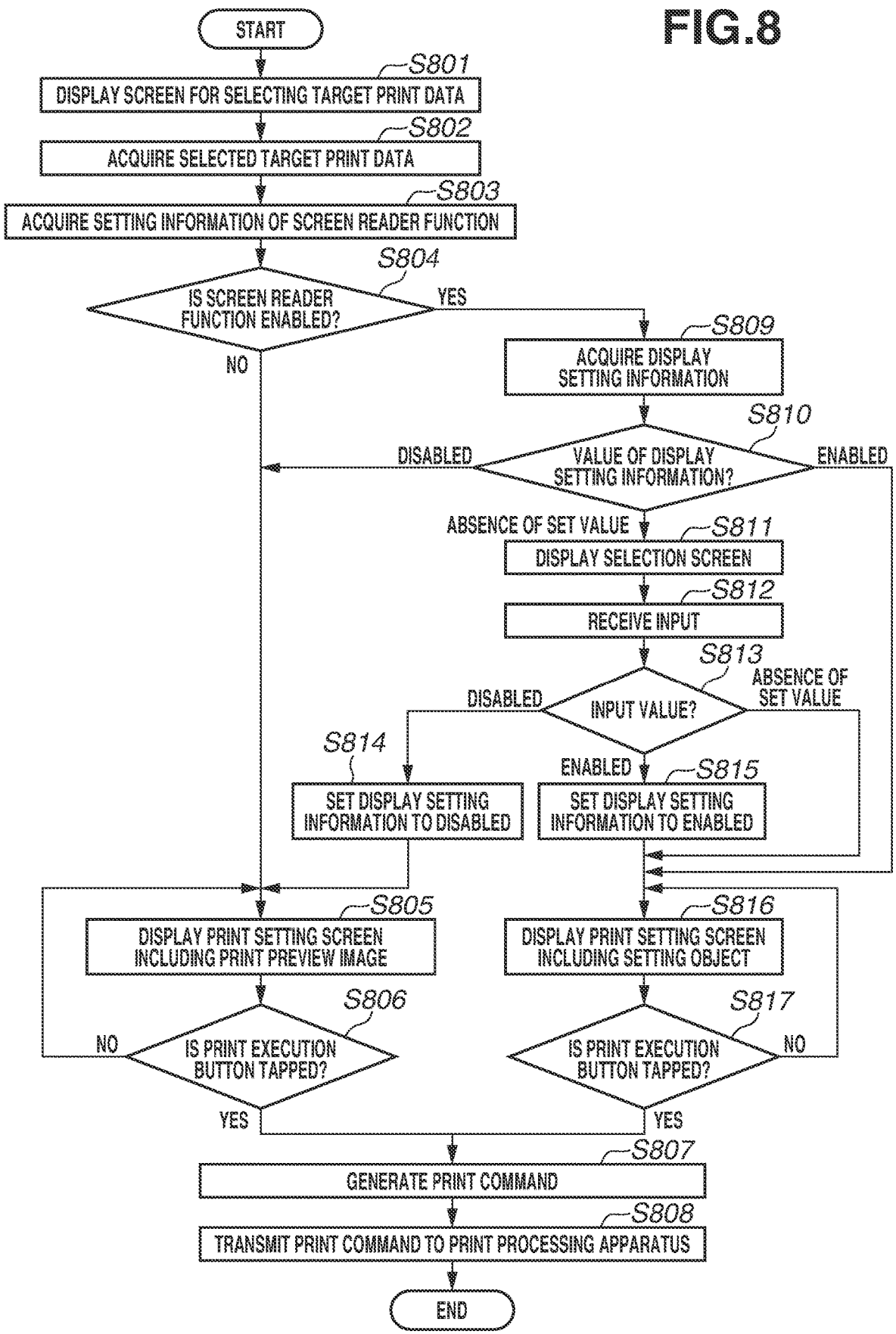
FIG. 8 is a flowchart illustrating one example of processing performed by the print application.

FIG. 8 is a flowchart illustrating processing until the print application 401 realizes the printing.

Processing in step S801 to step S808 illustrated in FIG. 8 is similar to the processing in step S501 to step S508 illustrated in FIG. 5. However, if the print application 401 determines that the screen reader function is enabled in step S804 (YES in step S804), the processing proceeds to step S809.

In step S809, the print application 401 acquires, from the storage device 209, display setting information indicating whether to make the display of the print setting screen enabled for the visually impaired person when the screen reader function is enabled. The display setting information can have any one value among enabled, disabled, and absence of value. The display setting information is one example of a display mode.

In step S810, the print application 401 determines whether the content of the display setting information acquired in step S809 indicates enabled, disabled, or the absence of the set value. If the print application 401 determines that the content of the display setting information acquired in step S809 indicates enabled (ENABLED in step S810), the processing proceeds to step S816. On the other hand, if the print application 401 determines that the content of the display setting information acquired in step S809 indicates disabled (DISABLED in step S810), the processing proceeds to step S505 even when the screen reader function is enabled. On the other hand, if the print application 401 determines that the content of the display setting information acquired in step S809 indicates the absence of the set value (ABSENCE OF SET VALUE in step S810), the processing proceeds to step S811.

Figure 9:
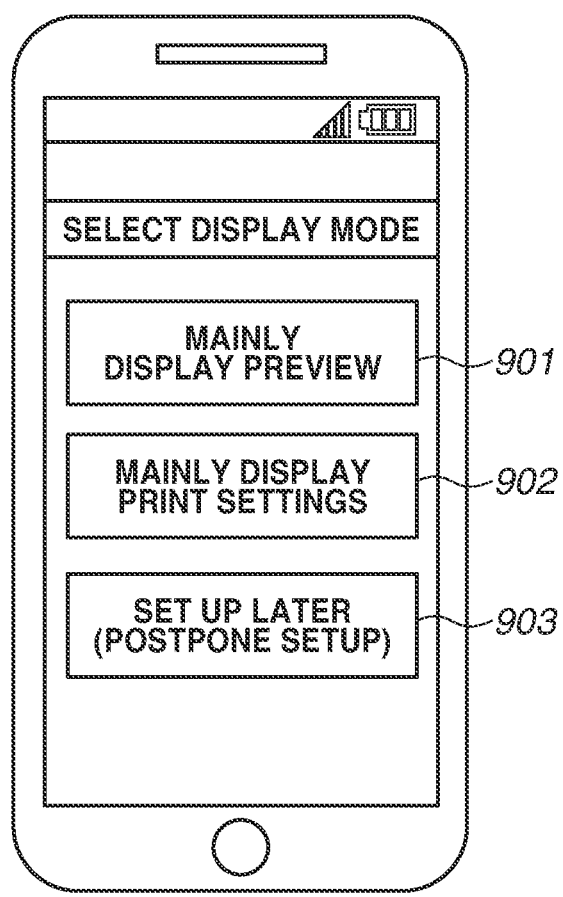
FIG. 9 illustrates one example of a selection screen to select a display screen.

In step S811, the print application 401 displays a selection screen, which is a screen used to select the setting value of the display setting information, on the display 214. The selection screen displayed in step S811 will be described with reference to FIG. 9. In the example illustrated in FIG. 9, the selection screen includes a button 901 used to select enabled, a button 902 used to select disabled, and a button 903 used to select the absence of the set value. The print application 401 receives an input of the setting value to the display setting information through detection of a tap onto any of the buttons 901 to 903 within the selection screen.

In step 812, the print application 401 receives an input of the setting value of the display setting information from the user via the selection screen displayed in step S811.

In step S813, the print application 401 determines whether the content of the input received in step S812 indicates enabled, disabled, or the absence of the set value. If the print application 401 determines that the content of the input received in step S812 indicates enabled (ENABLED in step S813), the processing proceeds to step S815. If the print application 401 determines that this content indicates disabled (DISABLED in step S813), the processing proceeds to step S814. If the print application 401 determines that this content indicates the absence of the set value (ABSENCE OF SET VALUE in step S813), the processing proceeds to step S816.

In step S814, the print application 401 stores the display setting information indicating enabled into the storage device 209. Even when the screen reader function is enabled, the processing proceeds to step S805 because the display setting information is a predetermined value (enabled). The print application 401 then displays, on the display 214, the print setting screen for the sighted person that includes the print preview image.

In step S815, the print application 401 stores the display setting information indicating enabled into the storage device 209.

In step S816, the print application 401 displays, on the display 214, the print setting screen including the setting object used to set the print setting item.

In step S817, the print application 401 determines whether the button 708 is tapped on the print setting screen displayed in step S816. If the print application 401 determines that the button 708 is tapped (YES in step S817), the processing proceeds to step S507. If the print application 401 determines that the button 708 is not tapped (NO in step S817), the processing proceeds to step S816.

In this manner, the processing according to the present exemplary embodiment allows the data processing apparatus 101 to display the print setting screen further suitable to the situation of the user.

The first and second exemplary embodiments have been described, assuming that, according to whether the screen reader function is enabled or disabled, the data processing apparatus 101 displays, on the display 214, the screen regarding the print function corresponding to each of them. However, the data processing apparatus 101 may display a screen regarding another function on the display 214. As another example, the data processing apparatus 101 may display a screen regarding a positional measurement function using the GPS or the like on the display 214.

For example, the data processing apparatus 101 displays, on the display 214, a screen indicating the current position while superimposing the position on a map as the screen regarding the positional measurement function. The visually impaired user may not be able to recognize the map screen. Accordingly, the data processing apparatus 101 displays, on the display 214, a screen regarding the positional measurement function. The screen includes a button to instruct the data processing apparatus 101 to output the current position by voice and/or a button to instruct the data processing apparatus 101 to output information about a route to a destination by voice.

The first and second exemplary embodiments have been described that the print application 401 displays any one of the print setting screen including the print preview image and the print setting screen including the setting object representing the print setting item. However, the print application 401 may be configured to display, on the display 214, both the print setting screen including the print preview image and the print setting screen including the setting object representing the print setting item in order by a so-called wizard method. In this case, the print application 401 may skip displaying the print setting screen including the print preview image, when the screen reader function is set to enabled.

The present disclosure can also be embodied by processing that supplies a program capable of performing one or more functions of the above-described exemplary embodiments to a system or an apparatus via a network or a storage medium, and causes one or more processors in a computer of this system or apparatus to read out and execute the program. The present disclosure can also be embodied by a circuit (e.g., an ASIC) capable of performing one or more functions.

For example, a part or a whole of the functional configuration of the above-described data processing system may be implemented on the data processing apparatus 101 and/or the like as hardware.

The exemplary embodiments of the present disclosure having been described in detail above. However, the present disclosure shall not be limited to these specific exemplary embodiments. The above-described individual exemplary embodiments may be arbitrarily combined.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-233250, filed Dec. 13, 2018, which is hereby incorporated by reference herein in its entirety.

What is claimed is:

1. An information processing apparatus including a display and a function to output on-screen information as speech, the information processing apparatus comprising:
    a controller including a processor and a memory, wherein the controller is configured to perform operations including:
    displaying on the display, in response to receiving a selection from a user of a button for printing an image file while the function is in a disabled state, a first screen that displays an image of the image file and a print setting button,
    displaying on the display, in response to receiving a selection from the user of the print setting button, a second screen that includes buttons that enable the user to set print options, and
    displaying on the display, in response to receiving the selection from the user of a button for printing the image file while the function is in an enabled state, a third screen that does not include the image of the image file, but includes the buttons that enable the user to set the print options.

2. A non-transitory computer-readable storage medium storing a program to cause a computer to perform a method for controlling an information processing apparatus including a display and a function to output on-screen information as speech, the method comprising:
    displaying on the display, in response to receiving a selection from a user of a button for printing an image file while the function is in a disabled state, a first screen that displays an image of the image file and a print setting button;
    displaying on the display, in response to receiving a selection from the user of the print setting button, a second screen that includes buttons that enable the user to set print options; and
    displaying on the display, in response to receiving the selection from the user of a button for printing the image file while the function is in an enabled state, a third screen that does not include the image of the image file, but includes the buttons that enable the user to set the print options.

3. A method for controlling an information processing apparatus including a display and a function to output on-screen information as speech, the method comprising:
    displaying on the display, in response to receiving a selection from a user of a button for printing an image file while the function is in a disabled state, a first screen that displays an image of the image file and a print setting button;
    displaying on the display, in response to receiving a selection from the user of the print setting button, a second screen that includes buttons that enable the user to set print options; and
    displaying on the display, in response to receiving the selection from the user of a button for printing the image file while the function is in an enabled state, a third screen that does not include the image of the image file, but includes the buttons that enable the user to set the print options.

4. The method according to claim 3, further comprising:
    determining whether the function is in the enabled state or in the disabled state,
    wherein, in a case where the user selection of the image file printing file button is received, displaying includes displaying the first screen in response to determining that the function is in the disabled state, and
    wherein, in a case where the user selection of the image file printing file button is received, displaying includes displaying the third screen in response to determining that the function is in the enabled state.

5. The method according to claim 3, wherein the second screen displays the print options, and the third screen displays the print options and does not display the image of the image file.

6. The method according to claim 5, wherein letters representing the print options displayed in the second screen are larger than letters representing the print options displayed in the third screen in a way that is configured to distinguish the print options displayed in the second screen from the print options displayed in the third screen.

* * * * *